(12) United States Patent
Kelkar

(10) Patent No.: US 9,442,863 B1
(45) Date of Patent: Sep. 13, 2016

(54) CACHE ENTRY MANAGEMENT USING READ DIRECTION DETECTION

(71) Applicant: VMWARE, INC., Palo Alto, CA (US)

(72) Inventor: Yuvraaj Kelkar, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 12 days.

(21) Appl. No.: 14/682,130

(22) Filed: Apr. 9, 2015

(51) Int. Cl.
*G06F 12/12* (2016.01)

(52) U.S. Cl.
CPC ........... *G06F 12/122* (2013.01); *G06F 12/128* (2013.01); *G06F 2212/69* (2013.01)

(58) Field of Classification Search
CPC .... G06F 12/12; G06F 12/121; G06F 12/122; G06F 12/126; G06F 12/127; G06F 12/128; G06F 2212/69
See application file for complete search history.

(56) References Cited

U.S. PATENT DOCUMENTS

| 2011/0010502 A1* | 1/2011 | Wang | G06F 12/121 711/128 |
| 2014/0115260 A1* | 4/2014 | Maybee | G06F 17/30132 711/136 |

\* cited by examiner

*Primary Examiner* — Hal Schnee

(57) ABSTRACT

This document describes techniques for cache entry management using read direction detection. In one set of embodiment, the caching system segregates cache entries into two lists. The caching system receives one or more requests to read a range of data from a cache entry in the first list. For each of these read requests, the caching system determines a read direction wherein the read direction is either a forward read or a backward read. The caching system then determines a relationship between the read directions and moves the cache entry from the first list to the second list based on the relationship.

15 Claims, 6 Drawing Sheets

CACHE ENTRY MANAGEMENT USING READ DIRECTION DETECTION

BACKGROUND

Many software systems interpose a caching layer, known simply as a cache, between the source of data and a storage medium used to persist the data such as a magnetic disk. When data is read from or written to the magnetic disk a copy of the data is stored as entry, sometimes referred to as a "cache line", in the cache. When the data is subsequently accessed, the copy of the data stored in the cache entry can be accessed more quickly from the cache than the magnetic disk because the caching layer is implemented in a faster storage medium such as random access memory (RAM) or a solid state disk (SSD). However, depending on the size of the cache and the size of the data, some cache entries must be periodically removed or "evicted" from the cache.

The set of algorithms that determine which cache entries should be removed from the cache are called eviction algorithms. One subset of cache eviction algorithms operates by segregating cache entries into two lists: 1) a recency list and 2) a frequency list. The recency list contains cache entries based on how recently the data was accessed. This type of list is commonly referred to a least recently used (LRU) cache because when the cache is full, the least recently accessed cache entries are evicted to make space for cache entries that have been accessed more recently. The frequency list contains cache entries based on how often the cache entries are accessed. This type of list is commonly referred to a least frequently used (LFU) cache because when the cache is full, the least frequently accessed cache entries are evicted to make space for data that have been accessed more recently.

In some cache eviction algorithm implementations, when data is stored in the cache, it is first stored as a cache entry in the LRU cache. If the data is subsequently accessed even one more time, it is them moved or "promoted" from the LRU cache to the LFU cache. Eventually, the cache entry may be evicted from the cache altogether because it has been removed from both LFU and LRU caches. When the size of cache entries is very large almost all cache entries are promoted from the LRU cache to the LFU cache resulting in the LRU cache being nearly empty while filling up the LFU cache to the point where cache entries will be evicted from the cache entirely.

Figure 1:
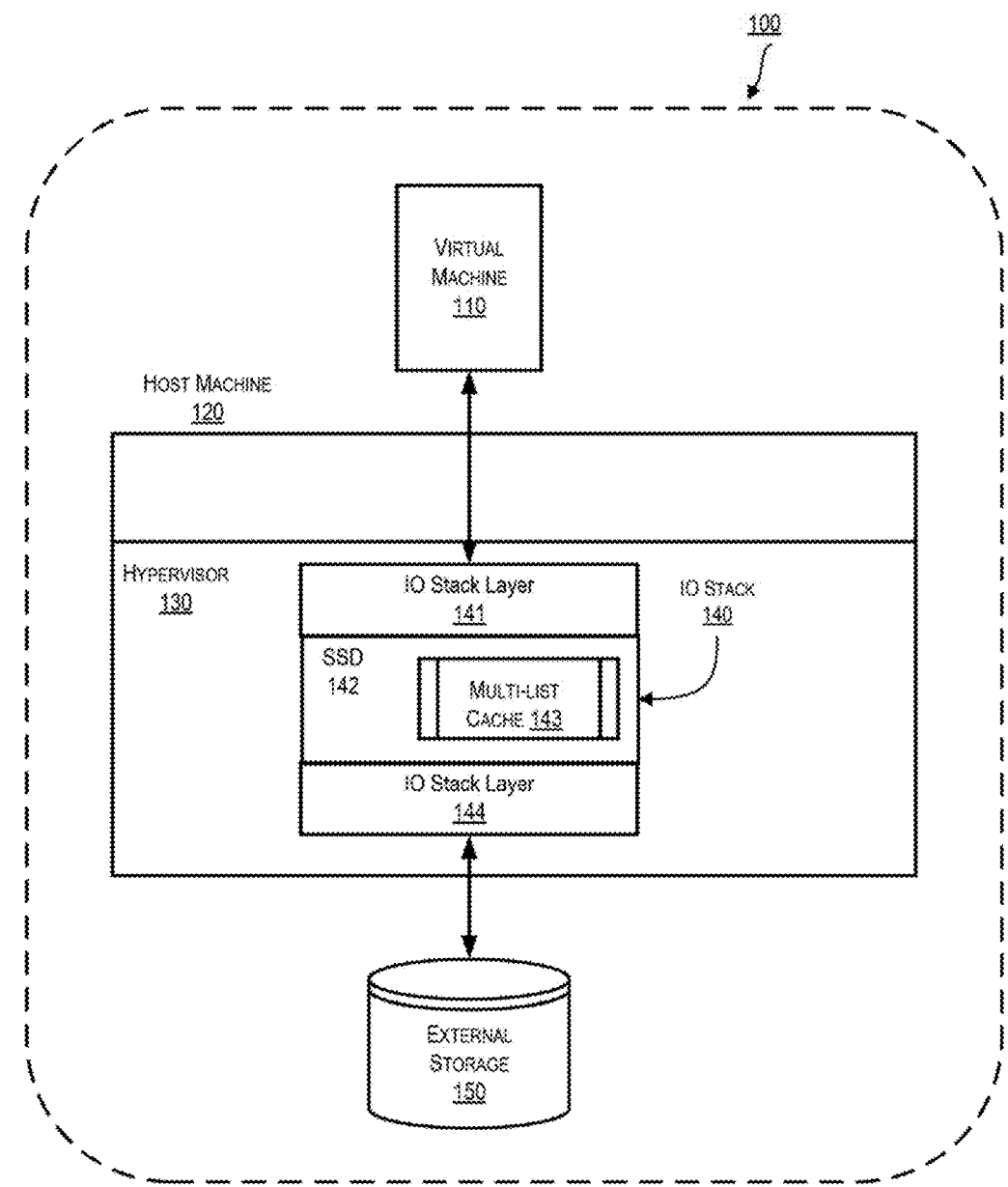
FIG. 1 depicts a system environment that supports cache entry management using access direction detection.

DETAILED DESCRIPTION in the following description, numerous examples and details are included to provide an understanding of various embodiments. However, it will be evident to one skilled in the art that certain embodiments can be practiced without some of these details, or can be practiced with modifications or equivalents of the details.

1. Overview

This disclosure describes techniques that enable caching systems to manage cache entries using access direction detection. In one set of embodiments, the caching system segregates cache entries into two lists. The caching system receives one or more requests to read a range of data from a cache entry in the first list.

For each of these read requests, the caching system detects a read direction wherein the read direction is either a forward read or a backward read. The caching system then determines a relationship between the read directions and moves the cache entry from the first list to the second list based on the relationship.

With the techniques described in the previous paragraphs, a caching system can effectively manage its cache entries. These techniques are advantageous when the cache entries are large and multiple read requests are directed to a single entry.

For example, assume that the typical cache entry represents a large file e.g. on the order of megabytes in size. When a software application reads this file, it may do so by accessing the file using many small read requests. Many previous caching systems typically move a cache entry from the first list to the second list as soon as the cache entry is accessed even one more time after it has been initially placed in the cache. A previous caching system using that heuristic would quickly move all of the entries in the first list to the second list resulting in the first list being underutilized and the second list being full. This approach is problematic for at least three reasons. First, the total amount of data that could be stored in the cache is unnecessarily limited because the space reserved for the first list is underutilized. A second, related problem is that entries in the second list are evicted too quickly because the second list is overutilized. Finally, when all the cached entries are moved to a just one list, the behavior of the eviction algorithm degrades to that of a single list. This eliminates the advantages of using a multiple list design.

In some embodiments the cache system moves a cache entry from the first list to the second list as soon as a read request for that cache entry is determined to be a backward read. This technique simplifies the how the cache determines when to move an entry because the caching system only needs to compare current read request to the previous read request to detect its read direction.

In other embodiments the cache system only moves an entry from the first list to the second list when it determined that the ratio of the number of backward read requests to the total number of read requests exceeds some threshold. This technique is more complex because the caching system may need to maintain counts of forward and backwards reads for each cache entry in order to calculate the ration, but provides a more fine-grained heuristic for determining when to move a cache entry from the first list to the second list.

In some embodiments, the cache system determines whether a read access is a forward read or a backward read by comparing the range of data specified in the current read request to the range of data specified in a previous read request. In particular, if the range of data specified in the current read request is located before the range of data specified by the previous read request the read request is determined to be backwards. On the other hand, if the range of data specified by the current read request is located after the range of data specified by the second read request the read request is determined to be forwards.

More specifically, in some embodiments the cache system compares an end of a range of data specified by the first read request with a start of a range of data specified by a second read request. The cache system detects that the read direction of the first read request is a backwards read if the end of the range of data specified by a first read request is located before the start of the range of data specified by the second read request. Finally, the cache system detects that the read direction of the first read request is a backwards read if the end of the range of data specified by a first read request is located after the start of the range of data specified by the second read request These and other aspects of the present disclosure are described in further detail in the following sections.

2. System Environment

FIG. 1 depicts a system environment 100 that supports cache entry management using access direction detection according to one embodiment. System environment 100 includes a virtual machine 110 running in hypervisor 130 running in host machine 120. Virtual machine may be running a guest operating system and a plurality of software applications (not shown).

The guest operating system or software applications may need to read and write data that is stored in external storage 150. In order to read data from and write data to external storage 150, virtual machine 110 communicates with external storage 150 using IO stack 140. IO stack 140 is provided by the kernel of hypervisor 130. When virtual machine 110 issues a request to read data from external storage 150, the read request is intercepted by hypervisor 130 and transmitted to external storage 150 through IO stack 140. IO Stack 140 includes a plurality of IO Stack Layers such as IO Stack Layer 141 and IO Stack Layer 144 that may use change or even cancel the read request. For example, the data requested by virtual machine 110 may be encrypted when it is stored in external storage 150. IO Stack Layer 144, may decrypt the data before it is passed to subsequent IO stack layers.

One layer of IO Stack 140 may be multi-list cache 143. As noted above, multi-list cache 143 may be implemented in SSD 142. In other embodiments, multi-list cache 143 may be implemented in RAM, NVRAM, flash memory or any other storage medium. When virtual machine 110 issues a read request for some data D located at location L in external storage 150, the read request is passed to IO Stack 140 by hypervisor 130 and ultimately to external storage 150. When the data D is returned by external storage 150 to virtual machine 110, it also flows back through IO Stack 140. When data D reaches multi-list cache 143, it may be stored in multi-list cache 143 before it is finally sent to virtual machine 110 along with location L. When virtual machine 150 subsequently issues a second read request for location L or some subrange of location L, that read request can be satisfied by returning data D or a subset of data D from multi-list cache 143 rather than from external storage 150.

If virtual machine 110 issues a request to write data $D_2$ to location L, hypervisor 130 also directs this write request to IO Stack 140. If location L exists in multi-list cache 143, the data in location L in the cache will be overwritten with $D_2$ before it is written to location L on external storage 150.

2. Multi-List Cache

Figure 2:
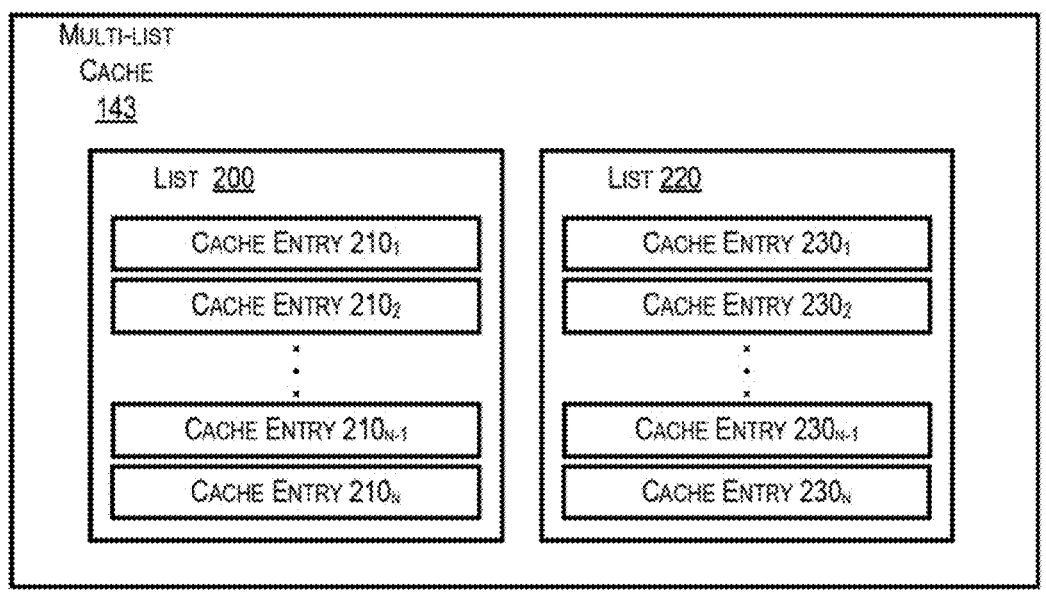
FIG. 2 depicts a multi-list cache.

FIG. 2 depicts a multi-list cache 143 according to some embodiments. Multi-list cache 143 includes two lists: a list 200 and list 210. In some embodiments, list 200 represents a least recently used (LRU) cache and list 220 represents a least frequently used (LFU) cache. List 200 includes a plurality of cache entries $210_1$ to $210_N$. List 220 includes a plurality of cache entries $230_1$ to $230_N$. List 200 and list 220 may be organized using any number of data structures that provide a way to retrieve cache entries based on some criteria. For example, list 200 may organize cache entries as nodes in a binary tree (b-tree) data structure. The key of each b-tree node may be the location of the data in external storage 150 and the value of the node may be the data retrieved from external storage 150.

In some embodiments, when virtual machine 110 reads data D from a location L on external storage 150, data D is first stored as a cache entry in list 200 because it has been characterized as recently accessed. For example, data D may be stored in cache entry $210_1$ using the key L. Each subsequent time that virtual machine 110 reads from location L, data D can be retrieved from cache entry $210_1$ rather than external storage 150.

Because list 200 and list 220 may only store a finite number of cache entries, list 200 may become full in the sense that list 200 is storing the maximum number of entries. At that point, or at any other designated point-in-time, multi-cache list 143 may choose to move cache entries from list 200 to list 220. In some embodiments, multi-level cache list determines which cache entries to move from list 200 to list 220 based on access direction detection.

3. Read Direction Detection

Figure 3:
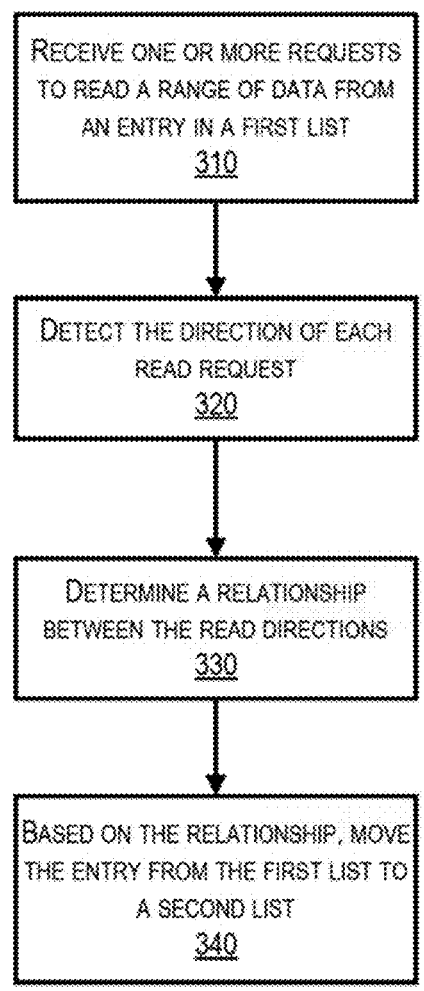
FIG. 3 depicts a process of using read direction detection to move a cache entry from one cache list to another.

FIG. 3 depicts a process of using sequential workload detection to move a cache entry from one cache list to another. In step 310, multi-list cache 143 receives one or more requests to read various ranges of the memory that includes data from a single cache entry in first list. For example, multi-list cache 143 may receive multiple requests to read ranges of data from cache entry $210_1$. The multiple read requests may be interspersed with read request for other cache entries. For example, the first read request may request to read a range of date from cache entry $210_1$, followed by a request to read a range of data from cache entry $210_n$ followed by a request to read data from cache entry 2001. The multiple read requests may be separated by any amount of time. For example, the first request to read a range of data from cache entry $210_1$ may occur at time T, the second request to read a range of data from cache entry $210_1$ may occur at time T+(1 second) and the third request to read a range of data from cache entry $210_1$ may occur at time T+(1 minute). The range of data specified by each read request may be the same or may be different. For example, the first request to read a range of data from cache entry $210_1$ may specify a range of 210 bytes, the second request to read a range of data from cache entry $210_1$ may specify a range of 300 bytes and the third request to read a range of data from cache entry $210_1$ may specify a range of 10 bytes.

At step 320, multi-list cache 143 detects the read direction of each request to read a range of data from a single, distinct cache entry in first list. In one embodiment, the multi-list cache 143 detects the read direction of a read request by comparing the range of data specified by the read request to another read request directed to the same cache entry. The process of detecting the read direction of a read request is described in more detail in subsequent figures.

At step 330, multi-list cache determines a relationship between the read directions. In one embodiment, multi-list cache determines that the relationship is that one and only one of the read requests is a backward read and the other read requests are forward reads. In this embodiment, the relationship may be determined as soon as the first backward read is detected.

In another embodiment, multi-list cache determines that the relationship is that the ratio of backwards reads to the total number of read accesses meets or exceeds some threshold value. For example, assume that the threshold value is 10%. Based on that assumption, if multi-list cache receives 10 read requests and 2 of them are backwards reads, then the relationship has been determined. Detecting the read directions of a cache entry is advantageous because they may imply whether a single process is reading the cache entry sequentially or several processes are reading the cache entry. For example, if a software application reads a large image from the cache entry, it is likely to do so in a set of forward sequential reads. In that case, a large number of reads should not cause the cache entry to move to the LFU cache because the large number of reads could be interpreted as a single large read. On the other hand, if the multi-list cache detects at least one backward read, that likely implies that multiple software applications are reading from the cache entry. In that case, the cache entry may be moved to the LFU cache because the entry is being accessed frequently.

At step 340, multi-list cache moves the cache entry from the first list to the second list based on the relationship among the read requests. For example, after determining the relationship between multiple requests to read ranges of data from cache entry $210_1$, multi-list would move cache entry $210_1$ from the from list 200 to list 220. In this context, moving an entry from one list can mean deleting the entry from the memory that includes list 200 and recreating it in the memory that includes list 220, modifying the data structures that represent list 200 and list 220 so that list 220 includes the entry, making a copy of the entry and inserting it into list 220 and deleting it from list 200 or any other technique recognized by someone skilled in the art.

Figure 4A:
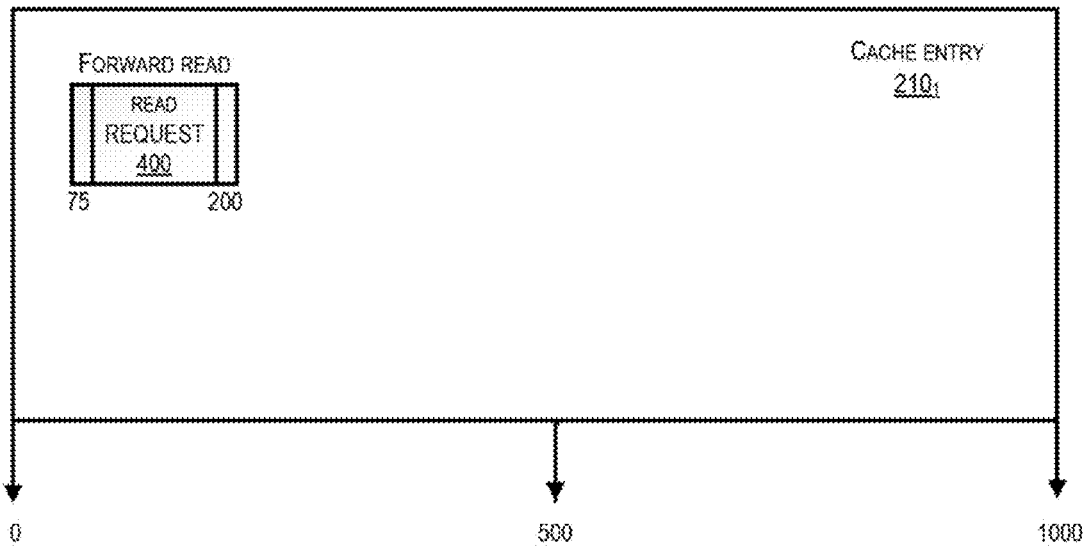
FIG. 4A depicts detecting the read direction of a first cache read request at time T.

FIG. 4A depicts detecting the read direction of a cache read request at time T. Read request 400 is a first request to read bytes 75 to 200 of cache entry $210_1$ at time T. The start of the range is byte 75 of cache entry $210_1$ and the end of the range is byte 200 of cache entry $210_1$. In other words, read request 400 reads all bytes of cache entry $210_1$ that are between byte 75 and byte 200 inclusive. Because read request 400 is the first request to read from cache entry $210_1$ multi-list cache 143 will detect the read as a forward read.

Figure 4B:
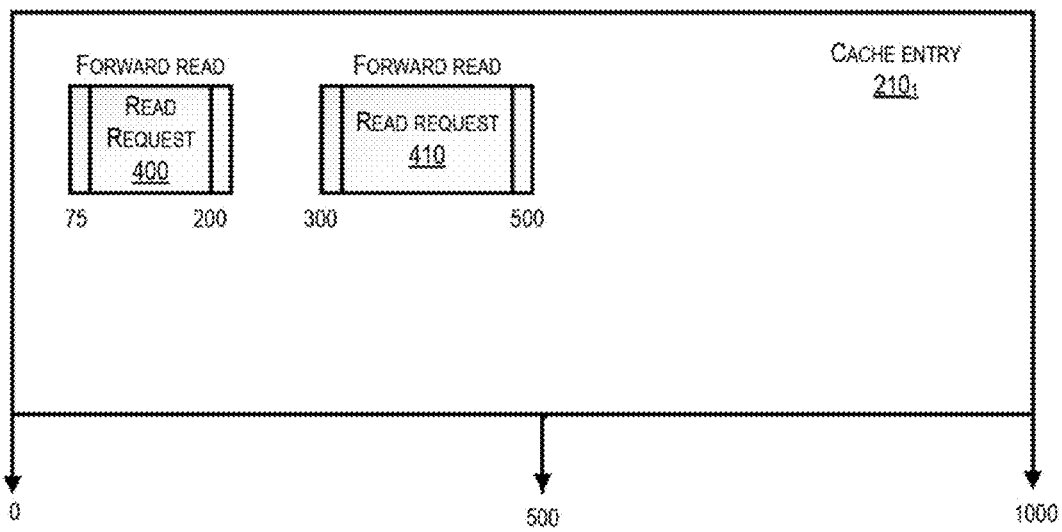
FIG. 4B depicts detecting the read direction of a second cache read request at time T+1.

FIG. 4B depicts detecting the read direction of a second cache read request at time T+1. Read request 410 is a second request to read a range of bytes cache entry $210_1$ at time T+1. Read request 400 is a first request to read bytes 75 to 200 of cache entry $210_1$ at time T. The start of the range of read request 410 is byte 300 of cache entry $210_1$ and the end of the range is byte 500 of cache entry $210_1$. In other words, read request 410 reads all bytes of cache entry $210_1$ that are between byte 300 and byte 500 inclusive. Because the start of the read request 410 is after the end of read request 400, multi-list cache 143 will detect the read as a forward read.

Figure 4C:
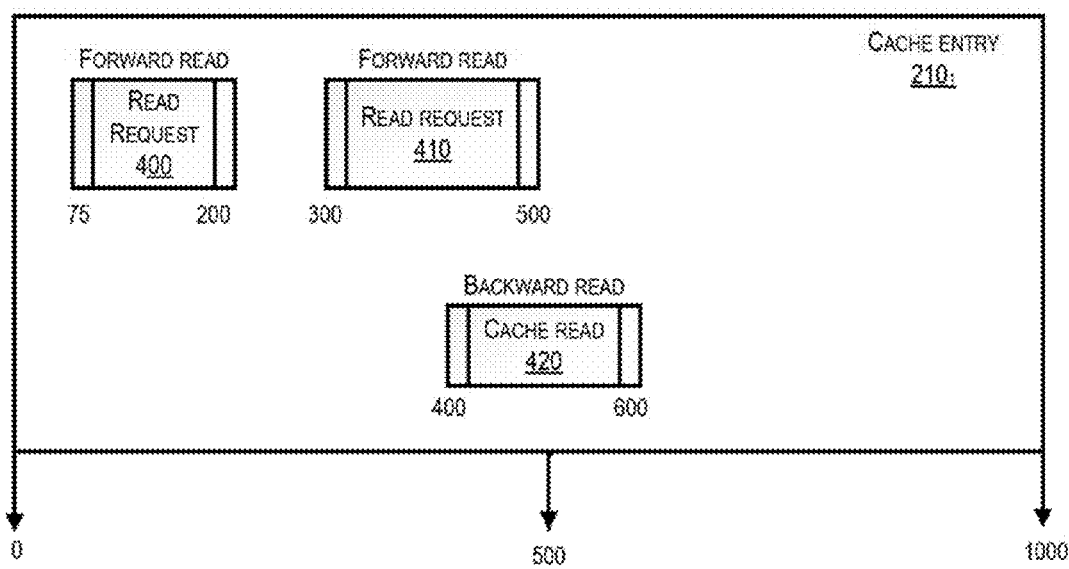
FIG. 4C depicts detecting the read direction of third cache read request at time T+.

FIG. 4C depicts determining the read direction of a third cache read request at time T+2. Read request 410 is a first request to read a range of bytes cache entry $210_1$ at time T+1. Read request 420 is a second request to read bytes 400 to 600 of cache entry $210_1$ at time T+2. The start of the range for read request 420 is byte 400 of cache entry $210_1$ and the end of the range is byte 600 of cache entry $210_1$. In other words, read request 420 reads all bytes of cache entry $210_1$ from byte 400 to byte 600. Because the start of the read request 420 is before the end of read request 410, multi-list cache 143 will determine it to detect the read as a backwards read.

The flowchart of FIG. 3 is illustrative and various modifications are possible. For example, although specific sequences of steps are shown, other sequences of steps may be performed in other embodiments. Further, steps described as sequential can be executed in parallel, order of steps can be varied, and steps may be modified, combined, added, or omitted. One of ordinary skill in the art will recognize many variations, modifications, and alternatives.

Certain embodiments described in this document can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described can be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, certain virtualization operations can be wholly or partially implemented in hardware. Many variations, modifications, additions, and improvements are possible, regardless the degree of virtualization. The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention (s). In general, structures and functionality presented as separate components in exemplary configurations can be implemented as a combined structure or component. Similarly, structures and functionality presented as a single component can be implemented as separate components.

Moreover, while the various embodiments are described as being implemented using virtualized systems that employ virtual machines and hypervisors, these embodiments may be implemented in physical computing environments such as a desktop computers, laptop computers, tablet computers, mobile devices such as a smartphones, server grade computer systems, or any other suitable hardware computing platform, including systems based on different variations of the well-known ARM or x86 architecture platforms.

As used in the detailed description and throughout the claims that follow, "a," "an," and "the" includes plural references unless the context clearly dictates otherwise. Also, as used in the detailed description and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for managing entries in a cache memory wherein the cache memory includes a first list and second list, comprising:
    receiving a plurality of read requests wherein each read request specifies a range of data to read from a single entry, the single entry being included in the first list;
    for each read request in the plurality of read requests, detecting a read direction, wherein the read direction is a forward read or a backward read;
    determining a relationship between the read directions; and
    based on the relationship, moving the single entry from the the first list to the second list.

2. The method of claim 1 wherein determining the relationship comprises:
    detecting that the read direction of a read request selected from the plurality of read requests is a backward read.

3. The method of claim 1 wherein determining the relationship comprises:
    determining that the ratio of the number of backward reads in the plurality of read requests to the total number of the plurality of read requests exceeds a threshold.

4. The method of claim 1 wherein detecting the read direction for a first read request in the plurality of read requests comprises:
    comparing a range of data specified by the first read request with a range of data specified by a second read request;
    detecting that the read direction of the first read request is a backwards read if the range of data specified by the first read request is located before the range of data specified by the second read request; and
    detecting that the read direction of the first read request is a forwards read if the range of data specified by the first read request is located after the range of data specified by the second read request.

5. The method of claim 1 wherein detecting the read direction for a first read request in the plurality of read requests comprises:
    comparing an end of a range of data specified by the first read request with a start of a range of data specified by a second read request;
    detecting that the read direction of the first read request is a backwards read if the end of the range of data specified by a first read request is located before the start of the range of data specified by the second read request; and
    detecting that the read direction of the first read request is a backwards read if the end of the range of data specified by a first read request is located after the start of the range of data specified by the second read request.

6. A system for managing entries in a cache memory wherein the cache memory includes a first list and second list, comprising:
    a processor; and
    a memory having stored thereon instructions which, when executed by the processor, cause the processor to:
    receive a plurality of read requests wherein each read request specifies a range of data to read from a single entry, the single entry being included in the first list;
    for each read request in the plurality of read requests, detect a read direction, wherein the read direction is a forward read or a backward read;
    determine a relationship between the read directions; and
    based on the relationship, move the single entry from the first list the second list.

7. The system of claim 6 wherein determining the relationship comprises:
    detecting that the read direction of a read request selected from the plurality of read requests is a backward read.

8. The system of claim 6 wherein determining the relationship comprises:
    determining that the ratio of the number of backward reads in the plurality of read requests to the total number of the plurality of read requests exceeds a threshold.

9. The system of claim 6 wherein detecting the read direction for a first read request in the plurality of read requests comprises:
    comparing a range of data specified by the first read request with a range of data specified by a second read request;
    detecting that the read direction of the first read request is a backwards read if the range of data specified by the first read request is located before the range of data specified by the second read request; and
    detecting that the read direction of the first read request is a forwards read if the range of data specified by the first read request is located after the range of data specified by the second read request.

10. The system of claim 6 wherein detecting the read direction for a first read request in the plurality of read requests comprises:
- comparing an end of a range of data specified by the first read request with a start of a range of data specified by a second read request;
- detecting that the read direction of the first read request is a backwards read if the end of the range of data specified by a first read request is located before the start of the range of data specified by the second read request; and
- detecting that the read direction of the first read request is a backwards read if the end of the range of data specified by a first read request is located after the start of the range of data specified by the second read request.

11. A non-transitory computer readable storage medium having stored thereon computer software executable by a processor, the computer software embodying a method for managing entries in a cache memory wherein the cache memory includes a first list and second list, the method comprising:
- receiving a plurality of read requests wherein each read request specifies a range of data to read from a single, the single entry being included in the first list;
- for each read request in the plurality of read requests, detecting a read direction, wherein the read direction is a forward read or a backward read;
- determining a relationship between the read directions; and
- based on the relationship, moving the single entry from the first list to the second list.

12. The non-transitory computer readable storage medium of claim 11 wherein determining the relationship comprises:
- detecting that the read direction of a read request selected from the plurality of read requests is a backward read.

13. The non-transitory computer readable storage medium of claim 11 wherein determining the relationship comprises:
- determining that the ratio of the number of backward reads in the plurality of read requests to the total number of the plurality of read requests exceeds a threshold.

14. The non-transitory computer readable storage medium of claim 11 wherein detecting the read direction for a first read request in the plurality of read requests comprises:
- comparing a range of data specified by the first read request with a range of data specified by a second read request;
- detecting that the read direction of the first read request is a backwards read if the range of data specified by the first read request is located before the range of data specified by the second read request; and
- detecting that the read direction of the first read request is a forwards read if the range of data specified by the first read request is located after the range of data specified by the second read request.

15. The non-transitory computer readable storage medium of claim 11 wherein detecting the read direction for a first read request in the plurality of read requests comprises:
- comparing an end of a range of data specified by the first read request with a start of a range of data specified by a second read request;
- detecting that the read direction of the first read request is a backwards read if the end of the range of data specified by a first read request is located before the start of the range of data specified by the second read request; and
- detecting that the read direction of the first read request is a backwards read if the end of the range of data specified by a first read request is located after the start of the range of data specified by the second read request.

* * * * *